United States Patent [19]

Hamilton et al.

[11] 4,247,853
[45] Jan. 27, 1981

[54] ALPHANUMERIC CRT DISPLAY SYSTEM WITH MEANS FOR STORING POSITIONAL DATA CALCULATED DURING AN INITIAL SCAN

[75] Inventors: Douglas A. Hamilton; Paul R. Herrold, both of Austin, Tex.

[73] Assignee: International Business Machines Corporation, Armonk, N.Y.

[21] Appl. No.: 47,435

[22] Filed: Jun. 11, 1979

[51] Int. Cl.³ ............................................. G06F 3/153
[52] U.S. Cl. .................................... 340/723; 340/724; 340/798
[58] Field of Search .............. 340/723, 724, 739, 798, 340/800

[56] References Cited

U.S. PATENT DOCUMENTS

| 3,437,869 | 4/1969 | Cobb et al. | 340/739 |
| 3,540,032 | 11/1970 | Criscimagna et al. | 340/739 |
| 3,618,032 | 11/1971 | Goldsberry et al. | 340/798 X |
| 3,816,823 | 6/1974 | Manber | 340/723 |
| 3,939,458 | 2/1976 | Kuntze | 340/723 |

Primary Examiner—David L. Trafton
Attorney, Agent, or Firm—J. B. Kraft

[57] ABSTRACT

A cathode ray tube display system is provided for displaying alphanumeric characters which are cyclically refreshed in the sequence of selected positions. The system has conventional means for moving the CRT beam through an arbitrary sequence of selected positions with reference to first and second coordinate axes, in response to position signals, and character defining means for deflecting the beam at each selected position within which a selected character may be defined and in response to signal representations of said selected character for modulating the beam intensity along said pattern to define the character.

The system further includes storage means for sequentially storing a coded representation of the character selected to be displayed as well as tab codes and carriage return codes for said displayed characters.

In addition, the means for generating said position signals include: (1) means responsive to an access tab code for calculating the tab position for the next character to be displayed with respect to the first coordinate axes only in the initial cycle during which each of the selected characters is formed, (2) means for storing each of these calculated tab positions, and (3) means operable only during refresh cycle responsive to a tab code for accessing the stored previously calculated tab position corresponding to said code.

5 Claims, 7 Drawing Figures

DISPLAY
INSTRUCTION
BUFFER
(PRESCAN)

DISPLAY
INSTRUCTION
BUFFER
(REFRESH)

TEXT
STORAGE BUFFER

ALPHANUMERIC CRT DISPLAY SYSTEM WITH MEANS FOR STORING POSITIONAL DATA CALCULATED DURING AN INITIAL SCAN

BACKGROUND OF THE INVENTION

This invention relates to text processing and display systems. More particularly, it relates to CRT display systems used for text processing wherein a substantial block of alphanumeric data has to be maintained on the CRT display, e.g., a full page display system.

The preparation of modern business documents often involves typing and editing several drafts of the document before it is complete, correct, and presented in a format that is both readily understandable and aesthetically pleasing to the eye of the reader. The steps of preparing a final printed copy of a document often entail: (1) Typing a rough draft from raw data, dictation equipment, or notes; (2) deletions, insertions, rearrangement and corrections by an editor; (3) retyping, using the edited rough draft as a source of information; (4) reediting to insure correctness and to insure aesthetic perfection; (5) retyping as necessitated by step (4) reediting to insure correctness of the final copy.

As can be seen from the above, each time information is typed, it must be reread and perhaps edited to insure that it is correct, and each time that it is edited, it must be retyped. This process is extremely time consuming inasmuch as the secretary's time is lost in retyping while the editor's time is lost in reediting.

Several devices have been proposed and utilized which shorten the amount of time lost in retyping and reediting business documents. A traditional prior art approach has been to record the characters typed on a secondary medium such as a magnetic medium which is selectively utilized by the typist to control the typewriter so that it will automatically printout the information contained in the first draft together with any subsequent editing changes. In recent years this traditional approach is being replaced by text processing systems utilizing cathode ray tube (CRT) displays or like displays which display information keyed into the text processing system of an associated input terminal such as the keyboard. The input information is displayed and corrections to the displayed data may be made by the operator. Such corrections would of course include entry of new data, deletion of existing data, or insertion of new data.

Presently available self-contained text processing systems contain the control electronics required to effect data editing in the CRT display utilizing the keyboard. These text editing systems generally have their own bulk storage wherein the characters to be displayed are stored in some convenient form. Once the information content being displayed is believed to be correct, data in the bulk storage is transmitted to a central microprocessor which then controls the printout of the information on any standard printer.

In the development of a text processing art as described above, many of the basic operations involve in the output of data followed the traditional lines initiated with automated typewriters. For example, many of the operations such as tabulation and carrier return traditionally involve a considerable amount of calculation whenever a tabulation code or carrier return code is encountered in the operation of the equipment. When encountering a tab code, for example, the equipment would go through an often elaborate calculation to determine where the text tab position would be and would then consequently proceed to that position where printing would resume. Such a calculation would involve the scanning of some sort of tab position storage means, i.e., "tab" racks, as well as means for correlating such information with various margin data.

With the above described approach where characters were stored on a secondary medium such as a magnetic medium during editing, the output of edited copy such as a draft or final form on a printer or typewriter would present no problem since the calculation of tabulation data and carrier return data fit well within the operating speeds of the equipment, i.e., in the order of from 20 to 75 characters per second.

It should be noted that the above-described complex approaches involved in the calculation of tabulation and carrier return position came about out of a desire to make the interface between the operator and the machine as simple and straight forward as possible. To this end, the text processing field has tried to make operator input operations such as tab or carrier return as close as possible to the operator input used for almost a century in traditional typewriters. Thus, when the tab or carrier return functions are calculated, the operator of text processing system has to do a little more with respect to tabulation or carrier return function than in conventional tab or carrier return operator inputs in typewriters.

It therefore followed that when displays began to be used in connection with text processing equipment, it was considered to be highly advantageous from the operator's point of view to keep the tabulation and carrier return inputs required on the part of the operator as simple and as close as possible to the inputs in conventional typewriting equipment.

However, with text processing system having the simple conventional operator input for tab and carrier return functions, the code designations for tab or carrier return functions are embedded or buried in the stored stream of character data. Because of this, relatively time consuming calculations have to be made by the system in order to convert such tabulation and carrier return codes to positional data displayed on the CRT screen.

Unfortunately, with such display text processing equipment, the time factor began to play a critical part. It was found to be increasingly difficult even in small one to five line displays to carry out all the data processing operations necessary to form the alphanumeric display during each refresh cycle. In CRT displays in order to avoid flickering, the refresh rate must be in the order of 45 Hertz. This permits in the order of about 22 milliseconds for each refresh cycle. With the development of the display text processing art, the problem has been further increased by the demand in the field for full page displays which would of course require an even greater increase in the number of operations which would have to be carried out during the 22 millisecond refresh cycle. The problem has been further compounded by the demand in the text processing field for proportionally spaced CRT displays to be compatible with systems in which the printed material is proportionally spaced, i.e., the alphanumeric characters have variable width. In such proportionally spaced systems instead of in the order of about 100 possible character positions per line of displays, there are over 750 possible escapement positions which have to be taken into account in carrying out the positional calculations for the displayed characters. This makes the data processing operations necessary to support each refresh cycle even more complex and time consuming.

One approach which has been used for minimizing data processing time during refresh cycles is to format a stored matrix of every possible character position on the CRT and to store at each character position sufficient data to identify the character or absence of character at that position together with any associated character attribute. While this approach has presented an acceptable solution to the refresh time needs and systems employing relatively small displays in the order from one to five lines, it is potentially very cumbersome and expensive in meeting the need for full page CRT text processing displays. The system requires in the order of one byte of data for each storage position, i.e., about 100×70 or in the order of 7000 bytes of data for a full page display.

BRIEF DESCRIPTION OF THE PRESENT INVENTION

Accordingly, it is the primary object of the present invention to provide an alphanumeric display system in which the time required for display refresh is minimized.

It is a further object of the present invention to provide a full page alphanumeric display system having a refresh frequency which avoids display flickering.

It is another object of the present invention to provide a full page alphanumeric display system having a refresh frequency which avoids display flickering while utilizing a minimum of storage capacity.

The present invention accomplishes the above objects by providing, in a cathode ray tube display system which has positioning deflection means for moving the cathode ray tube beam through a sequence of selected positions with reference to first and second coordinate axis in response to position signals, means for generating said position signals, character defining means responsive to signals representative of a selected character for deflecting the beam at each selected position in a pattern tracing the selected character and modulating beam intensity along said pattern to define the character and means for generating said signals representative of a selected character and for applying these signals to the character defining means, the improvement wherein:

the system includes storage means for sequentially storing the coded representations of the character selected to be displayed and tab codes and carrier return codes for said displayed characters, and the means for generating the position signals includes means responsive to an accessed tab code for calculating the tab position of the next character to be displayed with respect to the first coordinate axis only in the initial cycle during which each of the selected characters are formed, means for storing each calculated tab position, and means operable only during refresh cycles responsive to a tab code for accessing the stored previously calculated tab position corresponding to said code.

The apparatus may further include means responsive to an accessed carrier return code for calculating the carrier return position of the next character to be displayed with respect to the second coordinate axis only during the initial cycle during which each of the selected characters are formed, sequentially accessible storage means for storing each of said character return positions, and means operable only during refresh cycles responsive to a carrier return code for accessing the stored previously calculated carrier return position corresponding to said code.

BRIEF DESCRIPTION OF THE DRAWINGS

Referring now to the drawings, wherein a preferred embodiment of the invention is illustrated, and wherein like reference numerals are used throughout to designate like parts;

FIG. 3 also shows the timing sequence of said pulses.

DESCRIPTION OF THE PREFERRED EMBODIMENTS

General Description of Apparatus

Figure 1:
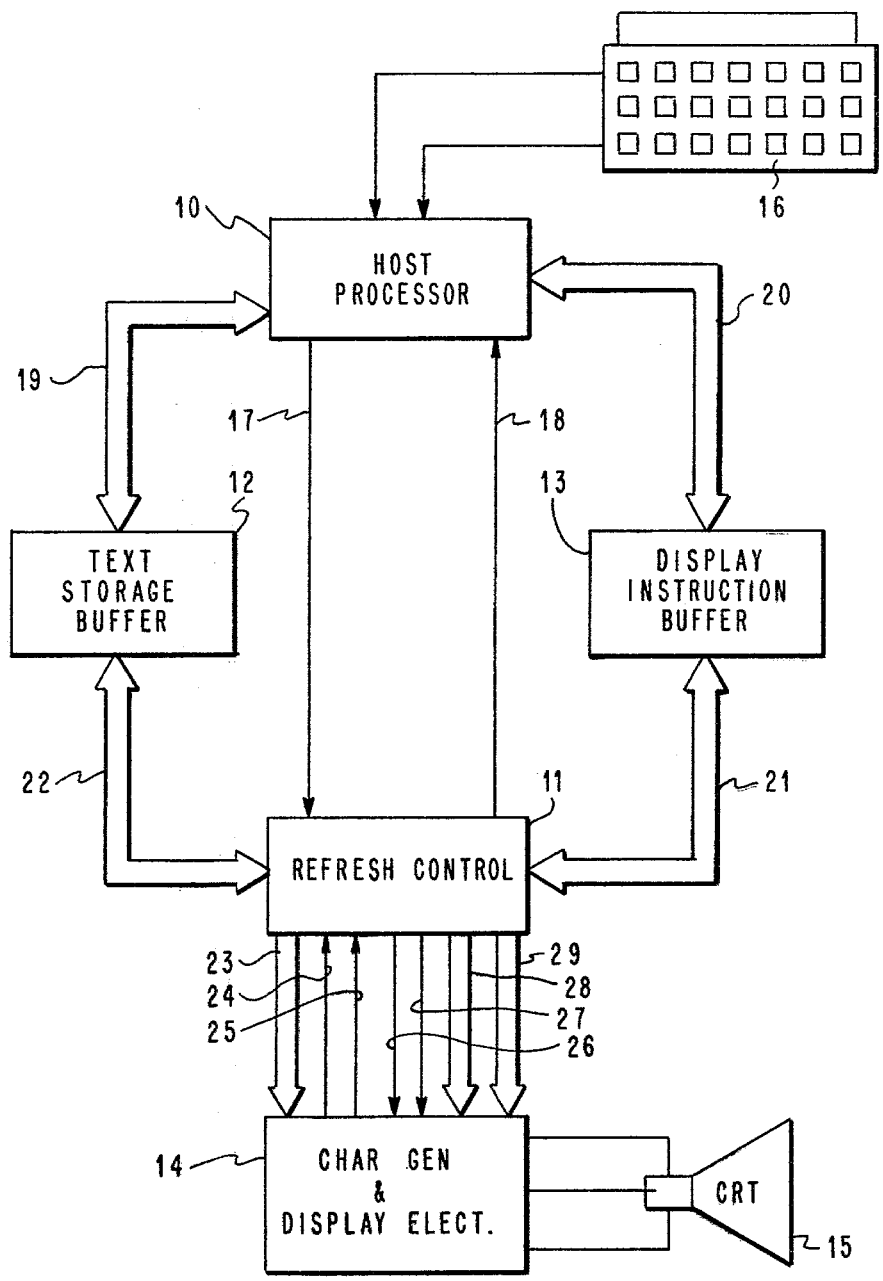
FIG. 1 is a generalized logic diagram showing the apparatus used in the present invention.

In setting forth an embodiment of the present invention, we will first describe the apparatus with which the system may be practiced followed by a description of the operations involved in the system. The apparatus shown very generally in FIG. 1 may be conveniently broken down into five major components: the host processor 10, the refresh control logic 11; memory units serving as buffers, i.e., the text storage buffer 12 which stores the text to be displayed and the display instruction buffer 13 which stores various display instructions associated with the text to be displayed, and the character generation and display electronics 14 which directly controls the scanning or tracing and stroking of the CRT 15 in order to display the stored text on said CRT.

The host processor 10 which may be any conventional commercially available microprocessor performs those activities in the text processing system associated with receiving the input from the operator usually through key strokes and inserting this input into the text buffer storage 12. Let us suppose that as the alphanumeric information is being displayed on CRT 15, the operator inputs new characters through keyboard 16. In order to insert these characters into the text storage buffer 12, refresh control of the CRT must first be halted. This is accomplished by the host processor generating and holding a signal on stop request line 17 and awaiting a response from refresh control logic 11 on stop line 18. When this occurs, the host microprocessor 10 updates the text storage buffer 12 through buss 19 to insert the new characters at their appropriate positions, also, the processor 10 initializes the display instruction buffer 13 via buss 20. The host processor 10 then releases the refresh electronics from the halt or stopped state by removing the output from stop request line 17. At this point, the apparatus under control of the display instruction buffer goes through an initial scan of the stored data to be displayed which may be referred to as a prescan wherein all tabulation calculations and/or carrier return calculations are carried out and stored.

In the general system shown in FIG. 1, the text storage buffer contains the coded representations of the alphanumeric characters to be displayed while the display instruction buffer 13 contains the sequence of instructions which will control the sequencing of the text alphanumeric character data from the text storage buffer 12 as well as the character attributes of the alphanumeric characters and the positioning of such characters on the CRT display. The refresh control logic performs those activities associated with fetching and executing the instructions from the display instruction buffer 13. These instructions, which will be described hereinafter in greater detail with respect to subsequent figures, include:

loading one of various registers to specify, for example, a new horizontal or vertical position on the CRT or the address of the next instruction or text character;

after any change in the text data in the text storage buffer, instructions to rescan the text storage buffer and rewrite the display instruction buffer to reflect the status of the text buffer;

instructions leading to the display of the characters in the text storage buffer 12 pointed to by text buffer address means;

set or reset the various modes under which characters may be displayed (character attributes) such as underscore, brightened or blinking;

during each refresh cycle, after all of the characters have been refreshed and there is still time until the beginning of the next refresh cycle, instructions which will cause the CRT to assume a relaxed state during this time, i.e., a minimum power dissipation state (a nondeflecting low power state).

In carrying out these various activities, the display instruction buffer communicates with the refresh control logic over buss 21 and the refresh control 11 communicates with the character generator and display electronics 14 through the following connections. When characters are being turned on during a character refresh cycle, the refresh control logic turns on stroke line 26 permitting the character generator and display electronics to form in a stroke display on a CRT a sequence of characters, the coded representations of which are sequenced from the text storage buffer via buss 22 through refresh control logic to the character generator and display electronics 14 via buss 23. The nature of the stroke character generator and display electronics 14 is not part of the present invention and thus will not be described in detail. Any standard character generator stroke display electronics for CRT displays such as that described in U.S. Pat. No. 3,609,745 may be used.

There are two outputs from the character generator and display logic 14: a signal on line 24 indicates that the character which was last requested to be formed by the refresh control logic 11 is completed; and a signal on line 25 indicates that the time-out of the minimum refresh period has elapsed and that the next refreshed period should begin. As noted above, if during a given refresh cycle all the characters are formed prior to this time-out signal, the refresh control logic 11 will institute a relax signal along line 27 which puts the character generator and display logic 14 into the relaxed state.

In addition, positional data for the alphanumeric characters being displayed is conveyed from refresh control logic along buss 28 and the various character attributes described above are conveyed from refresh control logic 11 along buss 29.

SPECIFIC DESCRIPTION OF APPARATUS

Figures 2, 3:
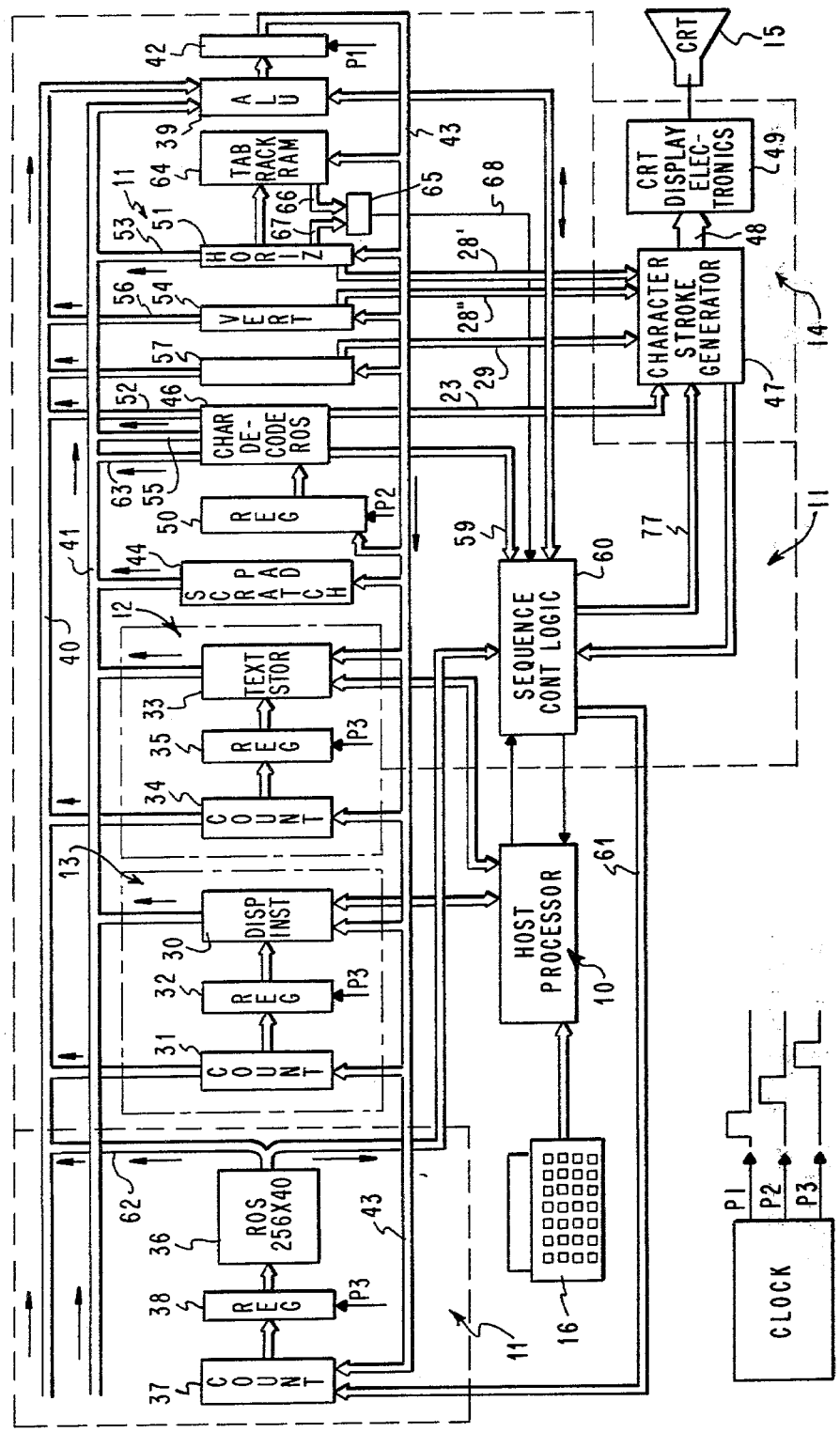
FIG. 2 is an illustration detailing more specifically the logic shown in FIG. 1.
FIG. 3 is a generalized drawing showing a clock reducing pulses P1, P2 and P3 used to time various operations with respect to FIG. 2.

With reference to FIG. 2, the apparatus shown generally in FIG. 1 is shown in greater detail. In FIG. 2, the functional units are shown with the logic constituting a functional unit blocked in by dashed lines; these functional units which are designated with the same numerals used in FIG. 1 are the host processor 10, refresh control logic 11, text storage buffer 12, display instruction buffer 13, character generator and display electronics 14 and the CRT 15.

The two basic memory or storage units of the system the text storage buffer 12 and the display instruction buffer 13 are shared between the host processor 10 and the refresh control logic 11 so that either buffer memory may be accessed independently by the host processor 10 or the refresh control logic 11. As will be hereinafter described in greater detail, both the host processor and the refresh control logic may change the context of the display instruction buffer 13. However, only the host processor may change the content of the text storage buffer.

Display instruction buffer 13 includes instruction storage array 30 which is conveniently 16 bits wide and randomly accessed by 16 bit address input through address counter 31 and 16 bit polarity hold register 32 which latches the address in 16 bit positions awaiting the input of timing pulse P3 to gate the address in register 32 to instruction array 30 so as to point to the next instruction. The alphanumeric text is stored in text storage array 33 of text storage buffer 12 as coded alphanumeric character representations each one byte wide and is similarly accessed through 16 bit address counter 34 and polarity hold register 35 which also requires a P3 clock pulse in order to point to the next character representation in text storage array 33.

At this point reference should be made to the clock shown in FIG. 3. The present system is driven by a three phase clock which generates three non-overlapping pulses, P1, P2 and P3. P1 is used to increment the system micro-program counter which will hereinafter be described in greater detail as well as to clock data into the ALU Buffer, also to be subsequently described in greater detail. P2 is used to load or increment or decrement various registers. P3 is used to load buffers between the various address counters and registers and the storage arrays which they address.

Refresh control logic 11, FIG. 2, will now be described in detail. As previously mentioned, the refresh control logic performs those activities associated with the fetching and execution of instructions from the display instruction buffer. As will be subsequently described with respect to the operation of this apparatus, the refresh control logic operates not only during the refresh cycle but also during the initial cycle during which each of the selected characters to be displayed is formed. Since the display instruction buffer 13 operates differently during the initial character formation than during the character refresh cycle, it will issue different instructions and consequently the refresh control logic will operate differently. In any event, refresh control logic apparatus 11, FIG. 2, has stored in a read only array 36 a wide variety of micro-instruction sets arranged so as to control the interaction of the various components of the apparatus shown in FIG. 2 so as to carry out the instructions obtained from display instruction buffer 13 in a sequence determined by sequence logic control 60. For the present embodiment, array 36 is a ROS of 256 words of 40 bits each and has associated therewith addressing means comprising an 8 bit address counter 37 and a 8 bit polarity hold register 38. The address counter and the polarity hold register operate much the same fashion as the previously described means for addressing instruction storage array 30 or text storage array 33, i.e., the application of clock pulse P3 to register 38 will result in the address being held in register 38 pointing to the appropriate micro-instruction byte in ROS 36. All computations in the refresh control logic are carried out in ALU (arithmetic logic unit) 39 which receives data via ALU input busses 40 and 41. The output of ALU 39 is latched in 16 bit polarity hold register 43 by the application of clock pulse P1 at which time the data in register 43 is output onto ALU output buss 43.

The apparatus further includes a scratchpad register file 44 in which many temporary parameters related to the text being displayed may be stored. For example, in a memory of 8 words of 16 bits each, parameters such as line spacing, left margin, and margin indentation may be stored. All of these parameters will be necessary to calculate a carrier return as will be subsequently described.

Character decode means 46 functions to decode or translate the coded representation of the alphanumeric characters as stored in the text buffer into an output transmitted via buss 23 to character stroke generator 47 which in turn will generate and transmit via buss 48 to CRT display electronics 49 the signals necessary to operate the display electronics so as to draw the alphanumeric character to be displayed on the CRT in a series of strokes. The input of the coded representation of the character to be displayed from the text storage array 33 to character decode 46 proceeds via input buss 41 through ALU 39 wherefrom it is output on output buss 43 from which it is loaded into character code polarity hold register 50 from which it is gated into character decode means 46 by an input clock pulse P2.

A 10 bit horizontal position register 51 keeps track of the escapement position. When a display operation is initiated, the initial horizontal position is stored in display instruction storage array 30. Loading this initial horizontal position into register 51 is accomplished by transmitting the position via buss 41 through ALU 39 and output register 42 onto output buss 43 from which it is loaded into horizontal register 51. During a refresh cycle when characters are being displayed, the horizontal position of the character will be communicated to character generator 47 over buss 28'. Then, after the character represented by the code loaded into character decode 46 has been displayed or refreshed, the horizontal escapement is incremented by loading the escapement value of the displayed character on to buss 40 via buss 52 and adding this escapement value to the horizontal escapement value which has been concurrently fed into ALU 39 via busses 53 and 41. This updated value is then passed from the ALU and its output register 42 via buss 43 back to horizontal register 51.

Vertical position register 54 keeps track of the vertical or line position of the display in a similar fashion. Initially vertical position is loaded into register 54 in a fashion similar to the loading of the horizontal register 51, i.e., the initial vertical position is transmitted from display instruction array 30 through ALU 39 and output register 42 to vertical register 54. During a refresh cycle when characters are being displayed, the vertical position of the character will be communicated to the character generator 47 over buss 28". Then, if a given character has a vertical displacement associated therewith, character decode 46 will load this vertical increment onto buss 41 via buss 55 to ALU 39 where it will be added to the current or last vertical position from register 54 via buss 56 and buss 40 to ALU 39 from which the updated value is output via output register 42 and buss 43 back to vertical register 54.

Coded representations of various character attributes such as underscore, brightness or blinking which are stored in the display instruction storage array 30 are loaded into character attribute register 57 at the time they are to be executed. Loading of character attribute register 57 proceeds through the ALU in the manner previously described. Register 57 which is conveniently a 3 bit register having the code determinative of the character attributes inputs this code via buss 29 into character stroke generator 47 and to the CRT display electronics 49 to operate the CRT 15 in the desired character attribute mode.

As has been previously mentioned, a significant aspect of the present invention involves means responsive to an accessed tab code for calculating the tab position of the next character to be displayed only during the initial cycle during which each of the selected characters is being formed. Such a function will now be described. Let us assume that we are in an initial cycle after a change in the information to be displayed, and the coded representations of the characters stored in the text storage array 33 is being sequentially addressed through address counter 34 and register 35 (prescanning) when the next coded representation is a tab code. Like any other addressed coded representation, the tab code will be output onto buss 41 through ALU 39 buss 43 and into character decode means 46 which upon the detection of a tab code will transmit a signal representative of a special non-graphic code over special function buss 59 to sequence control logic 60 which in combination with micro-instruction array 36 controls the execution of instructions in the present system. It should be noted that this signal is undifferentiated between tab codes and other non-graphic codes such as carrier returns.

Sequence control logic 60 will then signal micro-instruction array 36 via buss 61 to output the data field of the currently addressed micro-instruction to ALU 39 via busses 62 and 40. At the same time, character decode ROS 46 will output a seven bit value specifying the non-graphic code as a tab to ALU 39 via busses 63 and 41. The input from character decode means 46 and micro-instruction array 36 are added in ALU 39 and the result is output on buss 43 back to micro-instruction array 36 which through address counter 37 and register 38 will point to the stored micro-instruction sequence in array 36 necessary to calculate the tabulation to the next character position. For purposes of this embodiment, tab rack will be considered to consist of an array of 128 sequentially accessible bytes wherein a binary "1" on any bit will be indicative of a particular tab position, i.e., 1024 bit positions each of which will be sequentially accessed in the operation. The addressing of each bit position will be carried out by continuously incrementing horizontal position register 51 so as to address each of the 1024 bits. The data field of a micro-instruction from array 36 containing binary "1" is output through buss 40 to ALU 39 where it will be combined with the output 53 indicative of the last position of horizontal register 51 on buss 41. The output of ALU 39 is latched in register 42 and then transferred via buss 43 to be loaded into horizontal register 51, thus completing the incrementing operation to load 10 bits into register 51. The high order 7 bits in register 51 point to the first byte in tab rack 64, the 8 bits of which are loaded into 1 of 8 select means 65 via buss 66; each of the 8 bits is then addressed by the low order 3 bits of register 51 through buss 67. The previously described process of incrementing horizontal register 51 causes these 3 low order bits to sequentially address each of the 8 bits in select means 65. If no bit position in the byte is set to "1", the incrementing process will cause each of the subsequent bytes in the tab rack 64 to be addressed until a "1" bit indicative of a tab is found. At this point select means 65 will output a tab-located signal on line 68 to sequence control logic 60 which in turn will signal micro-instruction ROS 36 which in turn will issue an instruction through ALU 39 which will result in the value in horizontal position register 51 which is representative of the tabbed to position to be stored in the display instruction storage array 30 as a "go to" position, e.g., "GO TO HORIZONTAL ESCAPEMENT POSITION 95".

Let us now consider sequence of operations when during the initial cycle after a change in the information to be displayed when the next character representation loaded from text storage array 33 into character decode means 46 in the manner previously described turns out to be a carrier return code. The decode means 46 upon the detection of such a carrier return code will activate the carrier return operation by transmitting a signal representative of a special non-graphic code over special function buss 59 to sequence logic control 60 which will then signal micro-instruction array 36 via buss 61, where-upon array 60 will output its status to ALU 39 via busses 62 and 40. At the same time, character decode means 46 will output a signal indicator indicative of its carrier return status to ALU 39 via busses 63 and 41. The added inputs from character decode means 46 and micro-instruction array 36 in ALU 39 will result in an output on buss 43 back to micro-instruction array 36 which through address counter 37 and register 38 will point to the stored micro-instruction sequence in array 36 necessary to process the carrier return code.

The sequence involves accessing from scratchpad register file 44 the line spacing data stored therein and transmitting this data over buss 41 to ALU 39 where it is combined with the last vertical carrier position input to ALU 39 from vertical position register 54 over busses 56 and 40. The resulting output from ALU 39 is transmitted on buss 43 and then reloaded into vertical position register 54 as the new vertical carrier position. Next, in order to determine the initial horizontal position of the carrier return, the left hand margin position is removed from scratchpad register file 44 over buss 41 through ALU 39 and loaded into horizontal position register 51. If there is to be no indentation, this will represent the initial carrier return position, and micro-instruction ROS 36 will in turn issue an instruction through ALU 39 which will result in the values in vertical position register 54 and horizontal position register 51 representative of the carrier return position to be stored in the display instruction storage array 30 as a go to position, e.g., "GO TO LINE 45, ESCAPEMENT POSITION 15."

However, it is often the case that the line to which the carrier return is made has an indented initial point. Since the line is so indented, a count of the number of indent levels will be stored in scratchpad register file 44. In addition, for the particular line in which there is an indentation, a "1" tab bit will be stored at each respective bit position in tab rack 64 until the indentation position is reached. Then, utilizing the previously described tab detect sequence of operations, each of the tab positions is stepped through. For example, the indent is five escapement positions from the left margin, five consecutive "1" bits will be stored for the particular line in tab rack 64, and the previously described tab search routine will be executed five times. After the fifth tab signal on line 68 to logic control 60 as previously described is then communicated to micro-instruction array 36, the micro-instruction array will in turn issue an instruction through ALU 39 which will result in the values in horizontal position register 51 and vertical position register 54 being stored in display instruction storage array 30 as a go to position, e.g., "GO TO LINE 45, HORIZONTAL ESCAPEMENT POSITION 20".

OPERATION OF THE DISPLAY SYSTEM

Figure 4:
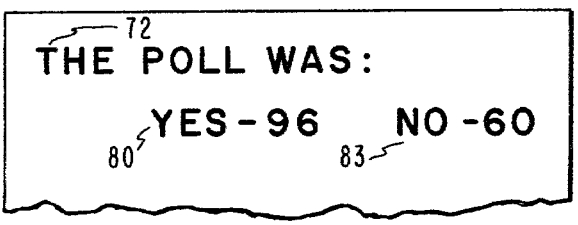
FIG. 4 is a diagrammatic illustration of an alphanumeric display used in an example of the operation of the present invention.

The operation of the system of the present invention will now be described with reference to FIGS. 4–7. Let us assume that the operator through the keyboard interface has, using the expedients previously described, updated the display so that the alphanumeric text to be displayed is shown in FIG. 4 in the form it is to appear on the CRT screen. Thus, the operator has communicated with the text buffer so that the text storage buffer has the information arranged in the sequence shown in FIG. 5. As previously mentioned, during the time that these changes are being made in the text, the refresh control 11 is halted. The host microprocessor (FIG. 1) updates the text storage buffer by inserting new characters at their appropriate positions. Also, the host processor 10 initializes the display instruction buffer 13 so that it is now ready for the prescan operation. At this point, the host micro-processor 10 releases the refresh electronics from the halt or stop state by removing the output from stop request line 17. The display instruction buffer is now ready for the prescan operation and contains the sequence of instructions illustrated in FIG. 6.

Figure 6:
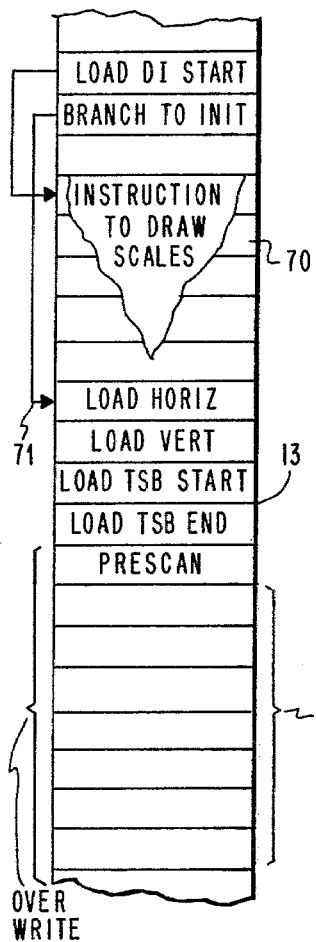
FIG. 6 is a diagrammatic illustration showing the sequence of instructions in the display instruction buffer needed for the prescan operation for the alphanumeric data arranged in the display of FIG. 4.
Figure 5:
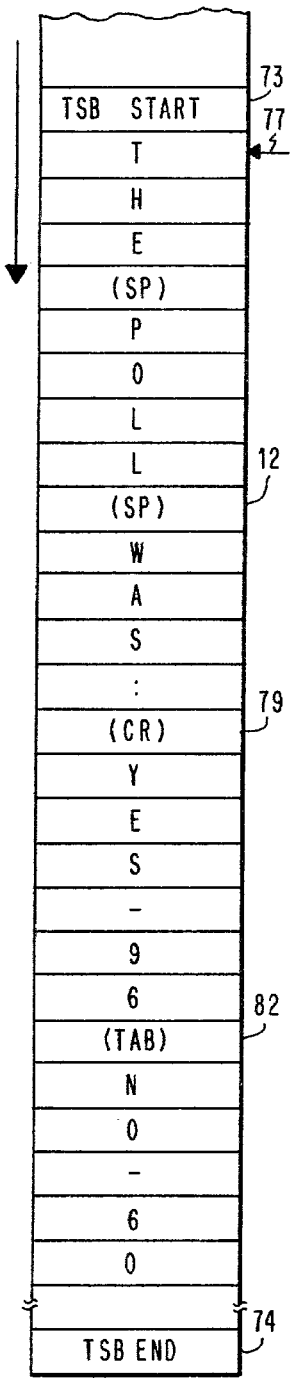
FIG. 5 is a diagrammatic illustration showing the sequence of instructions in the text storage buffer necessary to produce the alphanumeric display shown in FIG. 4.

Loaded as shown in FIG. 6, the display instruction buffer will output a series of instructions which will control refresh control 11 (FIG. 1 or 2) to implement prescan operation. The initial instruction in the display instruction buffer "Load DI START" merely results in the loading of instruction at section 70 in the sequence of instructions that are constant to any display operation, e.g., instructions to draw scale. The next instruction "BRANCH TO INIT." as shown by arrow 71 leads to a series of instructions which initialize a scan or prescan operation, i.e., Load Horiz. results in the loading in horizontal position register 51 (FIG. 2) of the horizontal position of "T" 72 (FIG. 4) which is the initial character in the display. Next, the instruction "Load Vert" results in the vertical position of character 72 being loaded in vertical position register 54 as previously described. Then, the instruction "Load TSB START" and the following instruction "Load TSB END" identify the TSB Start and TSB End instruction 73 and 74 in text storage buffer sequence (FIG. 5).

The next instruction "Prescan" will initiate the Prescan operation using the apparatus previously described with respect to FIG. 2 for scanning the sequence of alphanumeric and positional data in text storage buffer 12 (FIG. 5) and rewriting or overwriting the sequence of instructions indicated in the display instruction buffer 13 (FIG. 6) which include the "Prescan" instruction itself as well as the subsequent gap of instructions 75. As a result of this Prescan and Overwrite, the display instruction buffer 13 will then have the sequence of instructions set forth in FIG. 7 which now may be utilized for the repetitive refresh cycle of the equipment. In any event, getting back to the Prescan Operations with respect to FIGS. 5, 6, and 7, in the first instruction step the "Prescan" instruction itself is overwritten with instruction 76, FIG. 7, "Position Beam". The next instruction is "Load Text Ptr". After this instruction is entered in the Prescan, the pointer 77 (FIG. 5) is set to point to the first alphanumeric character "T" and the sequence of characters in text storage buffer 12 is sequenced through as previously described with respect to FIG. 2 by sequencing these characters through character decode ROS 46 (FIG. 2) while a relax pulse is applied to the character stroke generator 47 over line 77 from sequence control logic 60 to maintain the display in the relaxed or non-display state during the Prescan operation. Even though CRT is maintained in the relaxed state during this Prescan operation, an instruction "Start Display" 78 will be written into the display instruction buffer for use during the refresh cycle (FIG. 7) at the point coincident with the sequencing of the characters from text storage buffer 12 (FIG. 5). During this Prescan operation, the coded representation of the characters "THE(sp)POLL(sp)WAS:" will all be sequenced through character decode ROS 46 in the manner previously described and the apparatus will decode these characters into an output transmitted over buss 23 to character stroke generator 47. However, since character stroke generator 47 and consequently CRT display electronics 49 are in a relaxed state due to signal on line 77, no alphanumeric characters will be displayed durint this Prescan cycle.

At this point, character code 79 from the text storage buffer (FIG. 5) "(CR)" indicates a carrier return. When the code representing this carrier return function is input to character decode ROS 46 as previously described, the apparatus of FIG. 2 will operate to calculate the position of the carrier return which would be the position of the character "Y", 80 in the display of FIG. 4. This carrier return sequence involves accessing from scratchpad register file 40, the line spacing data stored therein and transmitting the data through ALU 39 where it is added to the last vertical carrier position from position register 54 which in turn will result in an updating of vertical position register 54 and to reflect the new vertical position.

Next, in order to determine the initial horizontal position of the carrier return, the left hand margin position is removed from scratchpad register file 44 into ALU 39 where it is combined with the number of indent levels also stored in scratchpad register file 44 to calculate the final indented position of "Y" character 80 (FIG. 4). This indented updated carrier return horizontal value is loaded into horizontal position register 51. When these operations are completed instruction 81 "Pos.Beam at X,Y" is loaded into the display instruction buffer so that it may be used during the subsequent refresh cycle. This instruction in effect tells the beam of the CRT to go to a definite position which is determined by the updated vertical and horizontal positions respectively now loaded into registers 54 and 51. Following this instruction, the instruction 82 "Start Display" is written into the display instruction buffer (FIG. 7) for use during refresh. This will initiate the display with the character "Y" 80 at the carrier return position during the refresh cycle.

Figure 7:
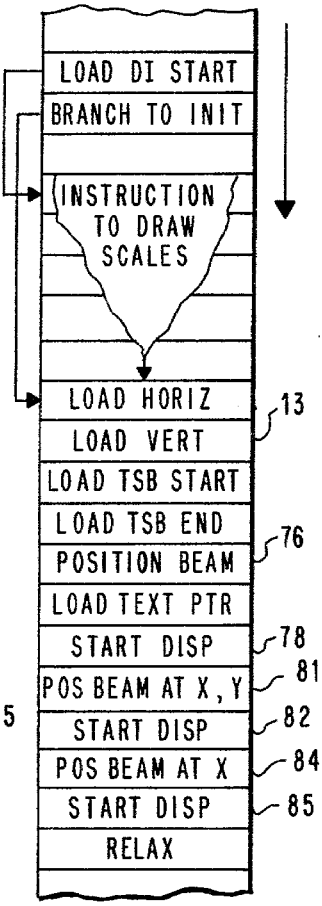
FIG. 7 is a diagrammatic illustration to illustrate the sequence of instructions in the display instruction buffer during refresh to maintain the alphanumeric display shown in FIG. 4.

Next during the prescan, the characters "YES-96" are sequenced through character decode ROS 46 in the manner previously described while the relax signal is still maintained on line 77, after which "(TAB)" character code 82 is decoded in character decode ROS 46 (FIG. 2). This results in the tab operation previously described with respect to FIG. 2 wherein through the utilization of tab rack 64 and point select means 65, the next tab-to position will be calculated and its value stored in horizontal register 51. At this point instruction 84 is writen into display instruction buffer 13 (FIG. 7) for subsequent use during the refresh cycle. This instruction directs the CRT display electronics to position the CRT beam at the horizontal position which is contained in horizontal position register 51 after the tab-to calculation has been made. This, of course, will be the horizontal position of the alphanumeric character "N" 83 (FIG. 4). Then, the instruction 85 "Start Display" is written into the display instruction buffer for refresh cycle use (FIG. 7).

Continuing the prescan operation, the code for characters "NO-60" is sequenced through character decode ROS 46 as previously described while the relax pulse is still maintained on buss 77 (FIG. 2). Since no further calculations need to be made during the prescan, the prescan will then be over in so far as the characters displayed in FIG. 4 are concerned. Since the prescan has concluded, a "relax" instruction is loaded into display instruction buffer 13 to signal the completion of a given refresh cycle.

Let us now consider a refresh cycle in which the display is active rather than relaxed in order to determine how the overwritten portion of the display instruction buffer operates. With reference to FIGS. 5 and 7, instruction 76 "Position Beam" results in the CRT beam being positioned at the first character "T" 72. Text pointer 77 (FIG. 5) is loaded by the display instruction buffer so that it points to a stored representation of the character "T". Next, the display instruction buffer outputs the instruction 78 "Start Display" which results in a stroke signal replacing the relax signal on buss 77 to the character stroke generator and CRT display electronics (FIG. 2). This sequences the following stream of characters from the text storage buffer 12 through character decode ROS 46: "THE(sp)POLL(sp)WAS:". As previously described for each character, the character decode ROS 46 outputs via buffer 23 to character code generator 47 and CRT display electronics 49 the signals necessary to operate the display electronics so as to draw the alphanumeric character to be displayed on the CRT in a series of strokes. This results in the display of the first line in the CRT display of FIG. 4. Next, when the character decode ROS detects the carrier return code (CR) 79 from text storage buffer 12, resulting in a special non-graphic code signal over special function buss 57 to sequence control logic 60, while at the same time character decode ROS 46 will output a 7 bit value on buss 63 specifying the non-graphic code as a carrier return code to ALU 39; the result will be an output on buss 43 back to micro-instruction array 36 which will in turn output an instruction back through ALU 39 to display instruction buffer 13 to access the next instruction 81 in the buffer which is to position the beam at the indicated carrier return position which has been previously calculated and stored. When this is completed, instruction 82 from display instruction buffer 13 (FIG. 7) starts the display at the carrier return position 80 (FIG. 4) and the sequence of characters "YES-96" from text storage buffer 12 passes through character decode ROS 46 as previously described resulting in the display of the corresponding alphanumeric characters as shown in FIG. 4.

At this point, TAB code 82 from text storage buffer 12 is input into character decode ROS 46. Again, a signal representative of a special function is output over special function buss 59 to sequence control logic 60 while at the same time character decode means 46 will output a signal indicative of the tab function to ALU 39 via buss 63. As a result, ALU 39 will address as instruction in micro-instruction array 36 which will in turn again through ALU 39 point to instruction 84 in display instruction buffer 13 which will proceed to position the beam at the previously calculated tab-to position corresponding to position 83 in the display shown in FIG. 4. At this point, the coded representations of the characters "NO-60" will be sequenced through character decode ROS 46 subsequent to the "Start Display" instruction 85 (FIG. 7) and the remainder of the second line: "NO-60" will be displayed in the CRT display of FIG. 4.

While the invention has been particularly shown and described with reference to a particular embodiment, it will be understood by those skilled in the art that various changes in form and detail may be made without departing from the spirit and scope of the invention.

What is claimed is:

1. In a cathode ray tube display system wherein alphanumeric characters are formed and cyclically refreshed in a sequence of selected positions along a plurality of lines comprising:

positioning deflection means for moving the cathode ray tube beam through said sequence of selected positions with reference to first and second coordinate axes in response to position signals, means for generating said position signals, character defining means for deflecting said beam at each selected position in a pattern within which a selected character may be defined and, in response signals representative of said selected character, for modulating the beam intensity along said pattern to define said character; and means for generating signals representative of a selected character and for applying said signals to said character defining means, the improvement wherein said system includes storage means for sequentially storing the coded representations of the characters selected to be displayed and tab codes and carrier return codes for said display characters, and said means for generating said position signals includes means responsive to an accessed tab code for calculating the tab position of the next character to be displayed with respect to said first coordinate axis only in the initial cycle during which each of said selected characters is formed, means for storing each of said calculated tab positions, and means operable only during refresh cycles responsive to a tab code for accessing the stored previously calculated tab position corresponding to said code.

2. The cathode ray tube display system of claim 1 wherein said character defining means are responsive to signals representative of a selected character, for deflecting said beam at each selected position in a pattern tracing said selected character and modulating the beam intensity along said pattern to define said character.

3. The cathode ray tube display system of claim 2 further including means responsive to an accessed carrier return code for calculating the carrier return position of the next character to be displayed with respect to said second coordinate axis only in the initial cycle during which each of said selected characters is formed, means for storing each of said calculated carrier return positions, and means operable only during refresh cycles responsive to a carrier return code for accessing the stored previously calculated carrier return position corresponding to said code.

4. The cathode ray tube display system of claim 3 wherein said tab codes and carrier return codes are stored in said storage means embedded in the stored coded character representations.

5. The cathode ray tube display system of claim 4 wherein said character defining means modulate the beam intensity in a sequence of stroke image elements.

* * * * *